United States Patent
Hill

(10) Patent No.: US 10,558,654 B2
(45) Date of Patent: Feb. 11, 2020

(54) DELTAITERATORS IN DATABASE SYSTEMS

(71) Applicant: Gerhard L. Hill, St. Leon-Rot. (DE)

(72) Inventor: Gerhard L. Hill, St. Leon-Rot. (DE)

(73) Assignee: SAP SE, Walldorf (DE)

(*) Notice: Subject to any disclaimer, the term of this patent is extended or adjusted under 35 U.S.C. 154(b) by 608 days.

(21) Appl. No.: 14/564,859

(22) Filed: Dec. 9, 2014

(65) Prior Publication Data
US 2016/0162541 A1 Jun. 9, 2016

(51) Int. Cl.
G06F 16/245 (2019.01)
G06F 16/2455 (2019.01)
G06F 7/24 (2006.01)

(52) U.S. Cl.
CPC .............. G06F 16/245 (2019.01); G06F 7/24 (2013.01); G06F 16/24564 (2019.01)

(58) Field of Classification Search
CPC . G06F 7/24; G06F 17/30424; G06F 16/24564
See application file for complete search history.

(56) References Cited

U.S. PATENT DOCUMENTS

| | | | |
|---|---|---|---|
| 7,372,857 B1 * | 5/2008 | Kappler | H04L 47/60 370/395.4 |
| 7,693,821 B2 | 4/2010 | Hill et al. | |
| 7,941,423 B2 | 5/2011 | Hill et al. | |
| 8,180,805 B2 | 5/2012 | Hill | |
| 8,271,478 B2 | 9/2012 | Hill et al. | |
| 8,296,289 B2 | 10/2012 | Hill | |
| 8,473,462 B1 * | 6/2013 | Banerjee | G06F 17/30091 707/640 |
| 8,478,793 B2 | 7/2013 | Hill et al. | |
| 8,577,925 B2 | 11/2013 | Hill | |
| 8,788,482 B2 | 7/2014 | Hill | |
| 2007/0260571 A1 * | 11/2007 | Mansfield | G06F 17/227 706/48 |
| 2011/0225116 A1 * | 9/2011 | Gupta | G06F 17/30592 707/602 |

(Continued)

OTHER PUBLICATIONS

Wikipedia, Merge Algorithm, https://web.archive.org/web/20050813234526/http://en.wikipedia.org:80/wiki/Merge_algorithm, Aug. 13, 2005, 7 pages.*

(Continued)

Primary Examiner — Marc S Somers
(74) Attorney, Agent, or Firm — Fish & Richardson P.C.

(57) ABSTRACT

The present disclosure describes methods, systems, and computer program products for using DeltaIterators in a database. One computer-implemented method includes, for each of multiple delta parts of a database that store values of an attribute of a table: identifying, by operation of a computer system, a set of values of the attribute stored in the delta part of the database, and identifying a current value in the set of values; identifying, a first critical value among the multiple current values, wherein the first critical value is a current value of a first set of values of the attribute stored in a first delta part of the database; outputting the first critical value; identifying a next value in first set of values; identifying a second critical value among the next value and the multiple current values except the first critical value; and outputting the second critical value.

18 Claims, 2 Drawing Sheets

(56) References Cited

U.S. PATENT DOCUMENTS

| | | | |
|---|---|---|---|
| 2011/0289061 A1* | 11/2011 | Lew | G06F 17/30336 707/696 |
| 2013/0159248 A1* | 6/2013 | Mueller | G06F 17/30 707/609 |
| 2014/0172833 A1* | 6/2014 | Taylor | G06F 17/30448 707/722 |

OTHER PUBLICATIONS

Wikipedia, Transitive Relation, https://web.archive.org/web/20071113175033/http://en.wikipedia.org:80/wiki/Transitive_relation, Nov. 13, 2007, 4 pp. (Year: 2007).*

* cited by examiner

DELTAITERATORS IN DATABASE SYSTEMS

BACKGROUND

A database iterator can traverse records, for example, values of an attribute of a table stored in a database. The iterator can return an ordered sequence of the values and facilitate subsequent processing in conjunction with the traversal, such as retrieval, addition, and removal of database records. In some implementations, the values of an attribute can be stored in different physical parts of the database. Each part can have a distinct physical implementation, data type, or other properties, requiring an iterator specifically designed for this part of the database. It is desirable to have a generic iterator that can handle different implementations of a database and traverse all values of an attribute stored across multiple parts of a database in an effective and computationally efficient manner.

SUMMARY

The present disclosure relates to computer-implemented methods, computer-readable media, and computer systems for using DeltaIterators in a database. One computer-implemented method includes, for each of multiple delta parts of a database that store values of an attribute of a table: identifying, by operation of a computer system, a set of values of the attribute stored in the delta part of the database, and identifying a current value in the set of values; identifying, a first critical value among the multiple current values, wherein the first critical value is a current value of a first set of values of the attribute stored in a first delta part of the database; outputting the first critical value; identifying a next value in first set of values; identifying a second critical value among the next value and the multiple current values except the first critical value; and outputting the second critical value.

Other implementations can include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, further comprising, for each of the multiple delta parts of the database: obtaining an ordered sequence of the set of values of the attribute stored in the delta part of the database, and wherein identifying a current value in the set of values comprises identifying a current value in the ordered sequence of the set of values.

A second aspect, combinable with any of the previous aspects, wherein the ordered sequence of the set of values of the attribute comprises the set of values in an ascending order according to a data type of the attribute.

A third aspect, combinable with any of the previous aspects, wherein the first critical value is a minimum value among the multiple current values.

A fourth aspect, combinable with any of the previous aspects, wherein identifying a first critical value among the multiple current values comprises identifying a relation between each two of the multiple current values.

A fifth aspect, combinable with any of the previous aspects, wherein identifying a second critical value among the next value in the first set of values and the multiple current values except the critical value comprises identifying the second critical value among the next value in the first set of values and the multiple current values except the critical value based on the relation between each two of the multiple current values.

A sixth aspect, combinable with any of the previous aspects, further comprising recording, for each delta part, whether a current value of the delta part is the first critical value among the multiple current values of the multiple delta parts.

The subject matter described in this specification can be implemented in particular implementations so as to realize one or more of the following advantages. The example techniques provide a class of iterators (referred to as DeltaIterators) that are general and flexible to iterate over attributes of any data type within a database table, any number of parts of the table, and/or any physical implementation of a part of the database (such as dictionary, B-tree, etc.). The iterators can produce a sequence of ordered values that are of the given data type, exactly once, independent of duplications in the parts and in the order defined by the data type (such as string, decfloat, datetime, etc.) of the attribute. The iterators can also be applied to large, complex datasets that support a variety of different data types. The example iterators can improve the efficiency and reduce computational complexity because all parts of a database table are traversed only once and are traversed simultaneously. They example iterators can reduce the number of value comparisons, which can be expensive, depending on the value type. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
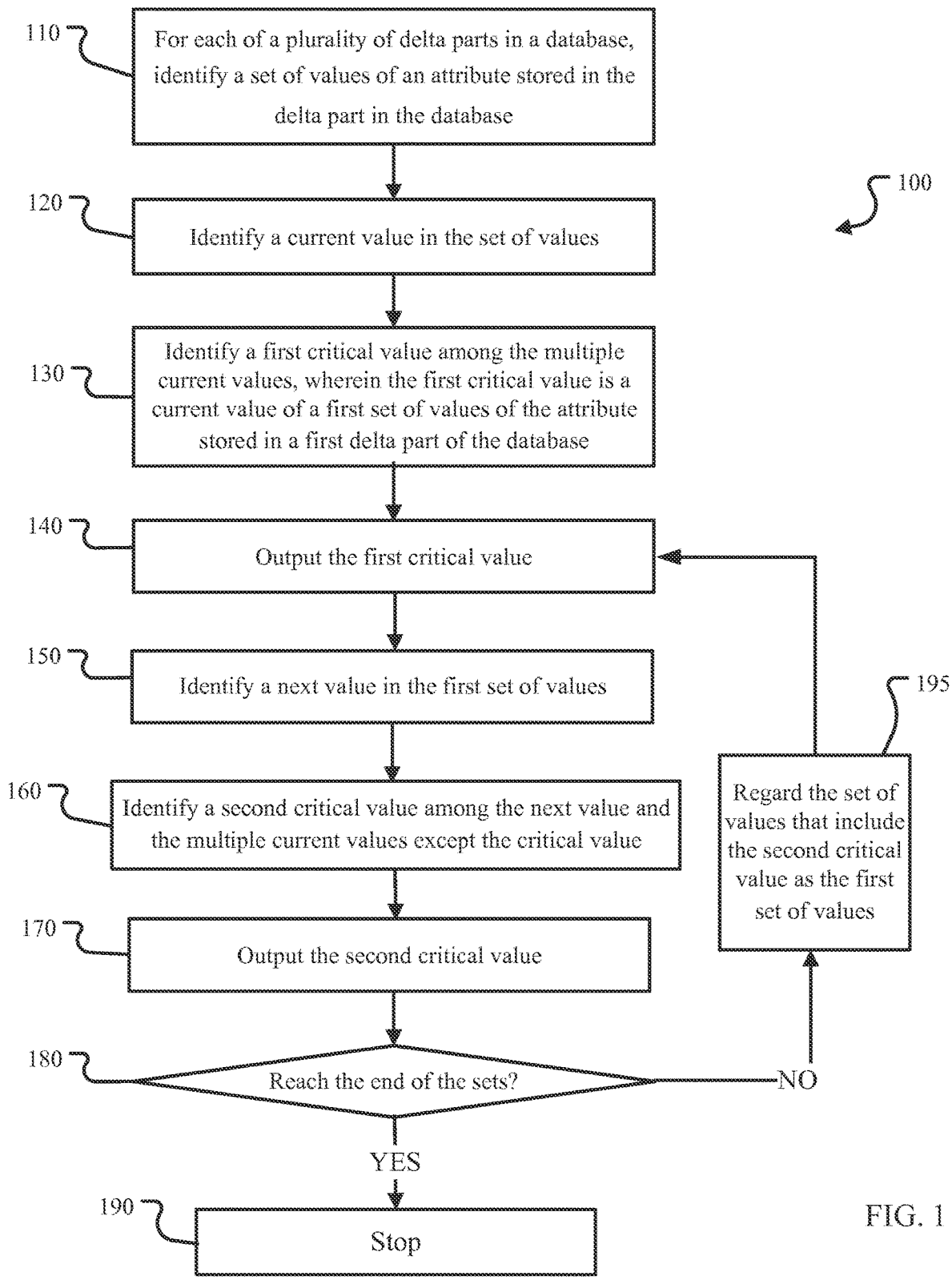
FIG. 1 is a flow chart illustrating a method for using DeltaIterators in a database according to an implementation.

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Iterating over all values of an attribute of a table is a common routine in a database. In some implementations, a database can include one or more parts. For example, a database can include a "main" part and one or more "delta" parts. The main part can contain the bulk of the data, old data, cold data, and/or other types of data. The delta part can contain new data and/or hot data that can be smaller compared to the "main" part. The delta part can be used to perform insertions, deletions, or any other modifications of values stored in the main part. Typically, these two parts are visible to outside (users). Invisible from outside the database, there can be an internally configured second delta part that can help ensure continued operation in special situations, for example, when main and delta parts are read-only (i.e., not writeable) because the delta part is merged into the main part. For purposes of illustration and readability, throughout this disclosure, and example main part is referred to as the "delta_0" part, the first delta part is referred to as the "delta_1" part, and the second delta part is referred to as the "delta_2" part. In a typical situation, a database can include the three parts of any attribute: delta_0, delta_1, delta_2.

In some implementations, the iteration operation can be complicated due to the variability of implementations of the database and the variability of the attributes of the tables stored in the database. For example, in some instances, the delta_x parts can be implemented by different realizations, such as plain vectors, bit compressed vectors, dictionaries, B-trees, hash maps, etc. In some implementations, the delta parts may or may not exist, and/or existing parts may or may not be empty. In an instance where the attributes of tables stored in the database can be of various (e.g., about 50 or more) data types, subtle inconsistencies can exist if a special opportunity or feature is exploited in one place but not in the other, or a reverse danger of a brute and inefficient approach can exist which excludes many possible opportunities for acceleration.

Example techniques are described for performing iterations in a database in a uniformed and efficient manner. For example, a new type of iterators, DeltaIterators, is introduced, which can operate on any attribute of any table of any data type with any number of physical parts. The DeltaIterators can enumerate every value of the attribute exactly once, independently of the duplications in the parts. The DeltaIterators can enumerate their values in the order defined by the data type (such as string, decfloat, datetime, etc.) or any other order. The DeltaIterators are efficient because all parts of the attribute are traversed only once and all parts are traversed simultaneously by using an individual iterator for each delta part and coordinating these individual iterators to traverse the attributes in their respective delta parts only once. In addition, the DeltaIterators can eliminate or reduce superfluous value comparisons (e.g., a value comparison is considered superfluous if it is either repeated or it could be deduced from other, already-executed-value comparisons).

An example table is given in Table 1 with three attributes A, B, and C. The attributes can be of the same or different data types.

TABLE 1

| A | B | C |
|---|---|---|
| b | 7 | bread |
| b | 2 | chocolate |
| c | 4 | waffle |

TABLE 1-continued

| A | B | C |
|---|---|---|
| a | 0 | cake |
| d | 5 | chocolate |
| c | 7 | cheese |
| d | 9 | Ice cream |
| e | 4 | candy |
| d | 0 | donut |
| c | 8 | chocolate |
| a | 6 | chocolate |
| f | 9 | candy |

A DeltaIterator can iterate over each attribute of a table. In some implementation, there are two ways of seeing the attribute: an external view or an internal view. Table 2 shows an example external view of the attribute A of Table 1. From the external view, a user can see the attribute logically as one contiguous column:

TABLE 2

| Attribute A of Table 1 |
|---|
| b |
| b |
| c |
| a |
| d |
| c |
| d |
| e |
| d |
| c |
| a |
| f |

Tables 3A-3C show an example internal view of the attribute A of Table 1. From the internal view, a computer system can see the attribute A as being split up into to 3 separate columns, due to data character (e.g., old—consolidated, new—not consolidated, hot—transactional):

TABLE 3A

| A - delta_0 |
|---|
| b |
| b |
| c |
| a |
| d |
| c |
| d |

TABLE 3B

| A - delta_1 |
|---|
| e |
| d |
| c |

TABLE 3C

| A - delta_2 |
|---|
| a |
| f |

The three delta parts can be physically different data stores, with all consequences, whose logical unity has to be preserved by software means. One example means is the DeltaIterator, whose task is to iterate over these three delta parts as shown in Tables 3A-3C. For example, using the common alphabetical order, upon repeated incrementing of the iterator the DeltaIterator should produce the sequence:

a, b, c, d, e, f, which is, the sequence of values in attribute A, ordered, free from repetitions, and independent of the physical parts. In some implementations, this can be achieved by using DeltaIterators.

As an example implementation (but by no means limited to this implementation), DeltaIterators can be realized as a class of C++ objects. For example, four subclasses can be defined as:

a DeltaIterator is a DeltaIterator that iterates over 0 non-empty parts (basic case without inheritance), a MonoDeltaIterator is a DeltaIterator that iterates over 1 non-empty part, a BiDeltaIterator is a DeltaIterator that iterates over 2 non-empty parts, and a TriDeltaIterator is a DeltaIterator that iterates over 3 non-empty parts.

As an example, for a BiDeltaIterator, it can iterate over two non-empty delta parts, such as any 2-element subset of {delta_0, delta_1, delta_2}. For example, in some instances, a BiDeltaIterator can iterate over delta_1 and delta_2. In some instances, the BiDeltaIterator can iterate over delta_0 and delta_1 (e.g., a frequent use case). Additional or different subclasses could be inherited from the base class DeltaIterator. One benefit of the chosen design is that every subclass knows its associated non-empty parts and does not have to lose time by repeatedly distinguishing whether this or that part exists or whether it is empty or not.

Every subclass of class DeltaIterator can use a number of OneDeltaIterators as its name indicates, for example:

a DeltaIterator uses 0 OneDeltaIterators, a MonoDeltaIterator uses 1 OneDeltaIterator, a BiDeltaIterator uses 2 OneDeltaIterators, and a TriDeltaIterator uses 3 OneDeltaIterators, where in all cases a OneDeltaIterator is designed to iterate over one delta of the attribute in question. As such, OneDeltaIterators need to be generic to handle all implementation types of attributes, and to handle all data types the database supports and/or knows of.

Take the TriDeltaIterator as an example, it uses three (3) OneDeltaIterators, for example, _it0, _it1, and _it2, and needs to coordinate the three OneDeltaIterators.

Consider the situation where all three OneDeltaIterators are not yet at the end of their delta parts. Therefore, each points to a value that can, for example, be referred to as _val0, _val1, and _val2. All 3 values can have a common data type, denoted by T.

Corresponding to the three values, there are three comparison results _rel_0_1, _rel_0_2, and _rel_1_2. Each of them can take three possible values: −1, 0, and 1. For example:

_rel_0_1=−1 means _val0<_val1 in the order of type T;

_rel_0_1=0 means _val0=_val1 in the order of type T; and

_rel_0_1=+1 means _val0>_val1 in the order of type T.

Similar meanings can apply to the other two results _rel_0_2 and _rel_1_2.

Assume that, currently:

_rel_0_1=−1,

_rel_0_2=0, and

_rel_1_2=+1.

In this situation, _val0=_val2 and both _val0<_val1, and _val2<_val1. Since _val0 and _val2 are the smallest of the three values, these two become the current value of the DeltaIterator. This can be recorded in the three BOOLEAN variables (referred to as hit variables) to indicate whether the current value of the delta part is the smallest value (and thus the current value of the DeltaIterator) among the multiple current values of the multiple delta parts. For example, in this case:

_hit0=true,

_hit1=false,

_hit2=true.

The six variables _rel_0_1, _rel_0_2, _rel_1_2, and _hit0, _hit1, and _hit2 can then suffice to derive an internal state of the DeltaIterator (a TriDeltaIterator in this case), based on its three OneDeltaIterators _it0, _it1, and _it2. Their interplay can be used to update them efficiently.

For example, only the OneDeltaIterators whose hit-variables are true are incremented. So, in this example _it0 and _it2 are incremented whereas _it1 is not. Let there still be new values in their respective delta parts, denoted as _val0' and _val2'.

Next, the rel-variables can be updated. This step can be the computationally expensive because it entails calls to expensive comparison functions (note that this is in general and not in all cases—depends on T).

For example, considering _rel_0_1, since _val0<_val1, before the incrementing of _it0 and _it2, no assumption on the new relation between _val0' and _val1 can be made. For the sake of this example, assume that recomputation results in:

_rel_0_1=+1 meaning the comparison changed from _val0<_val1 to _val0'>_val1.

Next consider _rel_1_2. It is the smaller value _val2 that increased (to _val2'), so a recomputation is unavoidable. Assume that the new outcome is:

_rel_1_2=+1 meaning that even with the increased value _val2 _val2'<_val1 still holds. But now the chain _val2'<_val1<_val0' implies by transitivity that _val2'<_val0', so that:

_rel_0_2=+1 can be derived without any computation. Accordingly:

_hit0=false,

_hit1=false, and

_hit2=true, indicating that now only _val2', the new value of _it2, represents the current value of the DeltaIterator.

Incrementing the DeltaIterator one more time, for illustration purposes only the OneDeltaIterator _it2 is incremented. Again assume that a new value _val2" exists. Accordingly, _rel_0_1 need not be recomputed, since neither _val0' nor _val1 changed, but _rel_0_2 needs recomputation. Assuming that the outcome changed back to:

_rel_0_2=0, the chain relation _val1<_val0'=_val2" holds, based on which the following results can be determined without any computation:

_rel_1_2=−1

_hit0=false,

_hit1=true, and

_hit2=false.

Applying the above-described example techniques to attribute A, to iterate over the example attribute A shown in Tables 3A-3C, and to obtain an ordered, free from repetitions sequence of values in attribute A, a TriDeltaIterator that includes three OneDeltaIterators, _it0, _it1, _it2 can be used. Specifically:

_it0 can iterate over A-delta_0,
_it1 can iterate over A-delta_1, and
_it2 can iterate over A-delta_2.

In some implementations, the OneDeltaIterators are equipped with enough intelligence (e.g., using dictionaries, hash maps etc.) and can produce the following example sequences upon incrementing, respectively:

_it0: a, b, c, d
_it1: c, d, e, and
_it2: a, f

Note that each of the produced sequence is ordered and free from repetitions. Each OneDeltaIterator sees only its respective delta part.

Using the variables _val0, _val1, _val2, _rel_0_1, _rel_0_2, _rel_1_2, and _hit0, _hit1, _hit2 as described above, the successive states within the DeltaIterator in this example are:

1) Initial state of the DeltaIterator:
_val0=a,
_val1=c, and
_val2=a.

Among the three values, the parts delta-0 and delta-2 have the smallest current values "a." As such, the current value of the DeltaIterator is "a." The relations between each two of the three values are given as:
_rel_0_1=-1,
_rel_0_2=0, and
_rel_1_2=+1.

The hit values are given as:
_hit0=true,
_hit1=false, and
_hit2=true.

2) Now increment the DeltaIterator in order to get its next value, if any. Referring again to _hit0 and _hit2, the DeltaIterator can execute this instruction by incrementing _it0 and _it2, but not _it1. Perform any necessary recomputation of the internal variables according to the example techniques described above, the second state of the DeltaIterator now becomes:
_val0=b,
_val1=c,
_val2=f,
_rel_0_1=-1,
_rel_0_2=-1 (implied by _rel_0_1 and _rel_1_2: _val0<_val1<_val2 implies _val0<_val2, so no computation is needed),
_rel_1_2=-1,
_hit0=true,
_hit1=false, and
_hit2=false, The current value of the DeltaIterator, as the result of incrementing it, is, referring to _hit0, the "b."

3) Increment the DeltaIterator again in order to get its next value, if any. Referring again to _hit0, the DeltaIterator executes this instruction by incrementing _it0, but neither _it1 nor _it2. Perform any necessary recomputation of the internal variables according to the example techniques described above, the third state of the DeltaIterator now becomes:
_val0=c,
_val1=c,
_val2=f,
_rel_0_1=0,
_rel_0_2=-1 (implied by _rel_0_1 and _rel_1_2: _val0=_val1<_val2 implies _val0<_val2, no computation is needed),
_rel_1_2=-1 (not recomputed since neither _val1 nor _val2 changed),
_hit0=true,
_hit1=true, and
_hit2=false.

The current value of the DeltaIterator, as the result of incrementing it, is, referring to _hit0 and _hit1, "c."

4) Increment the DeltaIterator again in order to get its next value, if any. Referring again to _hit0 and _hit1, the DeltaIterator executes this instruction by incrementing _it0 and _it1, but not _it2. Perform any necessary recomputation of the internal variables according to the example techniques described above, the fourth state of the DeltaIterator now becomes:
_val0=d,
_val1=d,
_val2=f,
_rel_0_1=0,
_rel_0_2=-1 (implied by _rel_0_1 and _rel_1_2: _val0=_val1<_val2 implies _val0<_val2, no computation is needed),
_rel_1_2=-1,
_hit0=true,
_hit1=true, and
_hit2=false.

The current value of the DeltaIterator, as the result of incrementing, refers to _hit0 and _hit1, "d."

5) Increment the DeltaIterator again in order to get its next value, if any. Referring again to _hit0 and _hit1, the DeltaIterator executes this instruction by incrementing _it0 and _it1, but not _it2. Perform any necessary recomputation of the internal variables according to the example techniques described above, the fifth state of the DeltaIterator now becomes:
_val0=co,
_val1=e,
_val2=f,
_rel_0_1=+1 (known without computation: co is bigger than any value),
_rel_0_2=+1 (known without computation: co is bigger than any value),
_rel_1_2=-1,
_hit0=false,
_hit1=true, and
_hit2=false.

The symbol co (infinity) indicates that _it0 is now at its end and no longer provides a new value. The choice of this symbol facilitates obtaining the right outcome of the comparison results _rel_0_1, _rel_0_2, _rel_1_2 (since co is bigger than any value).

The current value of the DeltaIterator, as the result of incrementing it, referring to hit1, is "e."

6) Increment the DeltaIterator again in order to get its next value, if any. Referring again to _hit1, the DeltaIterator executes this instruction by incrementing _it1, but neither _it0 nor _it2. Performing any non-superfluous recomputation of the internal variables according to the example techniques described above, the sixth state of the DeltaIterator now becomes:
_val0=∞,
_val1=∞,
_val2=f,
_rel_0_1=0 (known without computation: ∞=∞),
_rel_0_2=+1 (known without computation: ∞ is bigger than any value),
_rel_1_2=+1 (known without computation: ∞ is bigger than any value), _hit0=false,
_hit1=false, and
_hit2=true.

The current value of the DeltaIterator, as the result of incrementing it, is, referring to _hit2, "f."

7) Increment the DeltaIterator again in order to get its next value, if any.

Referring again to _hit2, the DeltaIterator executes this instruction by incrementing _it2, but neither _it0 nor _it1. Perform any non-superfluous recomputation of the internal variables according to the example techniques described above, the seventh state of the DeltaIterator now becomes:

_val0=∞,
_val1=∞,
_val2=∞,
_rel_0_1=0 (not recomputed since neither _val0 nor _val1 changed),
_rel_0_2=0 (known without computation: ∞=∞),
_rel_1_2=0 (known without computation: ∞=∞),
_hit0=false,
_hit1=false, and
_hit2=false.

The DeltaIterator has no current value as it is at its end. No more increment is needed. The iteration of the attribute A in the three delta parts completes. The ordered sequence, a, b, c, d, e, f free from repetitions and independent of their physical representations, is obtained.

FIG. 1 is a flow chart illustrating a method 100 for using DeltaIterators in a database according to an implementation. For example, method 100 can be used for traversing values of an attribute of a table stored in a database. The example method 100 can be performed, for example, by the example computer or computer system as described with respect to FIG. 2, or any other suitable system, environment, software, and hardware, or a combination of systems, environments, software, and hardware as appropriate. In some implementations, various steps of method 100 can be run in parallel, in combination, in loops, and/or in any order.

At 110, for each of two or more delta parts of a database each that store values of an attribute of a table, a set of values of an attribute stored in the delta part in the database is identified. In some implementations, one of the two or more delta parts can be a main part of the database. In some instances, the database can be a column store database and each set of values of the attribute can be a column of values for the attribute stored in the respective part of the database. In some implementations, the two or more delta parts are non-empty parts such that the execution efficiency of method 100 can be improved by avoiding repeatedly distinguishing whether a delta part exists or whether the delta part contains values of the attribute. As an example and as described with reference to Tables 3A-3C, the database can include three delta parts, delta_0, delta_1, and delta_2, that store the values of attribute A of Table 1. For each of the delta parts, delta_0, delta_1, and delta_2, a set of values (e.g., in a column) of the attribute A are shown in Tables 3A-3C. From 110, method 100 proceeds to 110.

At 120, a current value in the set of values is identified for each delta part. In some implementations, for each delta part, a respective iterator (e.g., OneDeltaIterator) can be used, for example, to traverse through the set of values within its delta part. In some implementations, the iterator can obtain an ordered sequence of the set of values of the attribute within the delta part, for example, based on the order defined by the data type of the attribute (e.g., string, numeric, datetime, etc.). In this case, identifying a current value in the set of values includes identifying a current value in the ordered sequence of the set of values, from example, from the beginning of the ordered sequence. The ordered sequence can be in an ascending order (e.g., as in the above-described example), a descending order, or any other order depending on the application of method 100. From 120, method 100 proceeds to 130.

At 130, a first critical value among the multiple current values is identified. The critical value can be the minimum value, maximum value, and/or other desired value among the multiple current values. The first critical value can come from one or more of the multiple sets of values of the multiple delta parts. The set of values that the first critical value belongs to can be referred to as a first set of values, while the corresponding delta part including the first set of values can be referred to as a first delta part of the database. In some implementations, the first critical value can be identified by identifying a relation between each two of the multiple current values. For instance, in the example described with reference to Table 3A-3C, at the initiation stage, three current values of the three sets of values stored in delta_0, delta_1, and delta_2 are "a," "c," and "a," respectively. By comparing each two of the multiple current values, the comparison results can be recorded by the three relation variables _rel_0_1=−1, _rel_0_2=0, and _rel_1_2=+1. The critical value among the current values is "a". In this case, both sets of values in delta_0 and delta_2 contain the critical value "a." Accordingly, both sets of values in delta_0 and delta_2 can be referred to as the first set of values, and both delta_0 and delta_2 can be referred to as the first delta part. In some implementations, a hit variable (e.g., _hit0, _hit1, or _hit2) can be created for each delta part to indicate and record whether the current value of the delta part is the critical value among the multiple current values of the multiple delta parts. In the above example, _hit0=true, _hit1=false, and _hit2=true, indicating both delta-0's and delta-2's current values are the critical value among the three current values. From 130, method 100 proceeds to 140.

At 140, the first critical value is output. The first critical value can be returned as the current value of the DeltaIterator. The first critical value can be output, for example, through a user interface to be presented to a user, or by storing it in a data store. From 140, method 100 proceeds to 150.

At 150, a next value in first set of values is identified, for example, by incrementing the iterator (e.g., OneDeltaIterator) used for the first set of values. In some implementations, only the iterator use for the first set of values is incremented where the iterators used for other sets whose current value is not the first critical value are not incremented, and their current values remain unchanged. For example, in the above-described example, at stage 2), the OneDeltaIterators _it0 and _it2 are incremented to identify next values, _val0=b and _val2=f, respectively. But the iterator _it1 is not incremented, its current value remains the same: _val1=c. In some implementations, the hit variables can be checked in order to determine which set of values should be incremented. From 150, method 100 proceeds to 160.

At 160, a second critical value among the next value and the multiple current values except the critical value is identified. In some implementations, the second critical values is identified based on the relation between each two of the multiple current values. Specifically, the second critical value can be identified by comparing the next value with one of the multiple current values except the first critical value, and inferring the relation between the next value and other current values based on the relations relation between each two of the multiple current values (e.g., as indicated by the relation variables, _rel_0_1, _rel_0_2=0, and _rel_1_2). As such, some comparison operations can be skipped based on the inference and thus improve the computational efficiency. For example, in the above-described example, at stage 2), each of the next values _val0=b and _val2=f is compared with the current value _val1=c, obtaining the relation _rel_0_1=−1 and _rel_1_2=−1. The comparison between the two next values can be saved because _val0<_val1<_val2 implies _val0<_val2, based on _rel_0_1 and _rel_1_2. From 160, method 100 proceeds to 170.

At 170, the second critical value is output. The first critical value can be returned as the current value of the DeltaIterator. The second critical value can be output in the same manner as the first critical value. From 170, method 100 proceeds to 180.

At 180, whether all values in all sets have been identified is determined. If all the values have been traversed, the method 100 proceeds from 180 to 190 where the method stops; otherwise, method 100 proceeds from 180 to 195.

At 195, the set of values where the second critical come from is regarded as the first set of values and the corresponding delta part is regarded as the first delta part so that method 100 can go back to 140 to repeat the above processes 150-180, until all the values of the attribute have been traversed.

Figure 2:
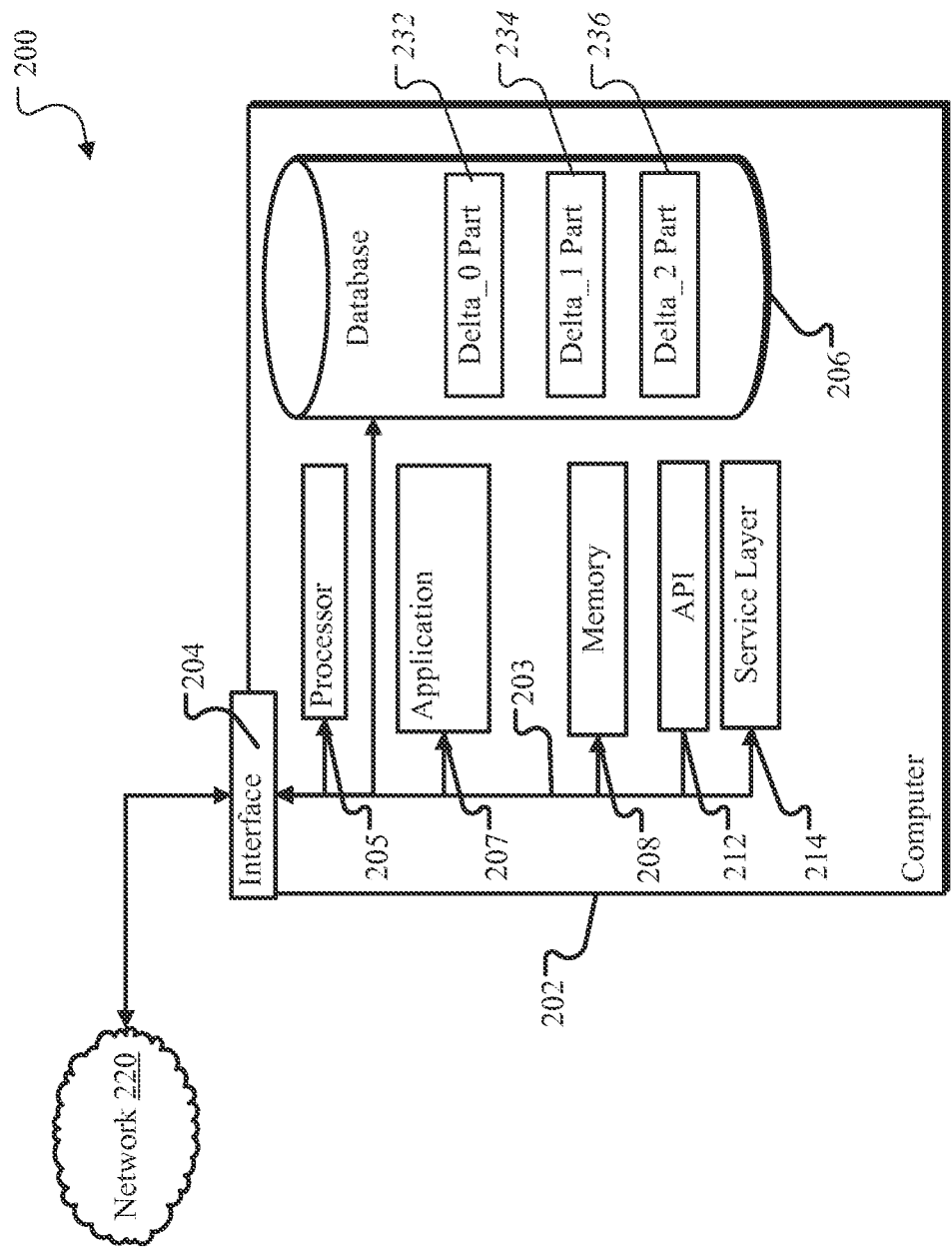
FIG. 2 is a block diagram of an exemplary computer that can be used for using DeltaIterators in a database according to an implementation.

FIG. 2 is a block diagram 200 of an exemplary computer 202 that can execute DeltaIterators, for example, for traversing values of an attribute of a table stored in a database according to an implementation. The computer 202 can be a stand-alone computer system or a component of an example distributed computing system (EDCS) for using DeltaIterators in a database according to an implementation. The illustrated computer 202 can encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 202 may comprise a computer that includes an input device, such as a keypad, keyboard, touch screen, or other device that can accept user information, and an output device that conveys information associated with the operation of the computer 202, including digital data, visual and/or audio information, or a GUI.

The computer 202 can process for/serve as a client, a server, a UI layer, an application, and/or any other component of the EDCS. The illustrated computer 202 is communicably coupled with a network 220. In some implementations, one or more components of the computer 202 may be configured to operate within a cloud-computing-based environment.

At a high level, the computer 202 is an electronic computing device operable to receive, transmit, process, store, or manage data and information associated with the EDCS. According to some implementations, the computer 202 may also include or be communicably coupled with a cloud-computing server, application server, e-mail server, web server, caching server, streaming data server, business intelligence (BI) server, and/or other server.

The computer 202 can receive requests over network 220 from a client application (e.g., a mobile UI, web-based application UI, and/or a desktop application executing on this or another computer 202 in use by a user/customer) and respond to the received requests by processing the said requests in an appropriate software application. For example, the computer 202 can receive a query from a user to perform an iteration over all values of an attribute in a table stored in the database 206. The values of the attribute can be stored in multiple delta parts 232, 234, and 236 of the database 206. In addition, requests may also be sent to the computer 202 from internal users (e.g., from a command console or by other appropriate access method), external or third parties, other automated applications, as well as any other appropriate entities, individuals, systems, or computers.

Each of the components of the computer 202 can communicate using a system bus 203. In some implementations, any and/or all the components of the computer 202, both hardware and/or software, may interface with each other and/or the interface 204 over the system bus 203 using an API 212 and/or a service layer 214. The API 212 may include specifications for routines, data structures, and object classes. The API 212 may be either computer language-independent or -dependent and refer to a complete interface, a single function, or even a set of APIs. The service layer 214 provides software services to the computer 202 and/or the EDCS. The functionality of the computer 202 may be accessible for all service consumers using this service layer. Software services, such as those provided by the service layer 214, provide reusable, defined business functionalities through a defined interface. For example, the interface may be software written in JAVA, C++, or other suitable language providing data in extensible markup language (XML) format or other suitable format. While illustrated as an integrated component of the computer 202, alternative implementations may illustrate the API 212 and/or the service layer 214 as stand-alone components in relation to other components of the computer 202 and/or EDCS. Moreover, any or all parts of the API 212 and/or the service layer 214 may be implemented as child or sub-modules of another software module, enterprise application, or hardware module without departing from the scope of this disclosure.

The computer 202 includes an interface 204. Although illustrated as a single interface 204 in FIG. 2, two or more interfaces 204 may be used according to particular needs, desires, or particular implementations of the computer 202 and/or EDCS. The interface 204 is used by the computer 202 for communicating with other systems in a distributed environment—including within the EDCS—connected to the network 220. Generally, the interface 204 comprises logic encoded in software and/or hardware in a suitable combination and operable to communicate with the network 220. More specifically, the interface 204 may comprise software supporting one or more communication protocols associated with communications such that the network 220 or interface's hardware is operable to communicate physical signals within and outside of the illustrated EDCS.

The computer 202 includes a processor 205. Although illustrated as a single processor 205 in FIG. 2, two or more processors may be used according to particular needs, desires, or particular implementations of the computer 202 and/or the EDCS. Generally, the processor 205 executes instructions and manipulates data to perform the operations of the computer 202. Specifically, the processor 205 executes the functionality required for using DeltaIterators in a database.

The computer 202 also includes a database 206 and memory 208 that hold data for the computer 202 and/or other components of the EDCS. Although illustrated as a single database 206 and memory 208 in FIG. 2, two or more databases 206 and memories 208 may be used according to particular needs, desires, or particular implementations of the computer 202 and/or the EDCS. While database 206 and memory 208 are illustrated as integral components of the computer 202, in alternative implementations, the database 206 and memory 208 can be external to the computer 202 and/or the EDCS. The database 206 can include multiple parts, such as, delta_0 part 232, delta_1 part 234, and delta_2 part 236. In some implementations, one of the delta part can be implemented as a main part. In some implementations, the database 206 can be a conventional database or an in-memory database, or a mix of both. In some implementations, the database 206 can be a column-store database or a row-store database, or a mix of both. In some implementations, the database 206 and memory 208 can be combined into one component.

The application 207 is an algorithmic software engine providing functionality according to particular needs, desires, or particular implementations of the computer 202 and/or the EDCS, particularly with respect to functionalities required for using DeltaIterators in a database. Further, although illustrated as a single application 207, the application 207 may be implemented as multiple applications 207 on the computer 202. In addition, although illustrated as integral to the computer 202, in alternative implementations, the application 207 can be external to the computer 202 and/or the EDCS.

There may be any number of computers 202 associated with, or external to, the EDCS and communicating over network 220. Further, the term "client," "user," and other appropriate terminology may be used interchangeably as appropriate without departing from the scope of this disclosure. Moreover, this disclosure contemplates that many users may use one computer 202, or that one user may use multiple computers 202.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," and/or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
   for each of a plurality of delta parts of a database that store values of an attribute of a database table, coordinating simultaneous traversal through an identified set of values within each delta part of the plurality of delta parts, wherein the traversal of each value of the set of values within each delta part is performed once using a delta iterator assigned to, and configured to only interact with, a particular delta part, wherein subclasses of a delta iterator data object class implementing the delta iterator are configured to be aware of non-empty delta parts of the plurality of delta parts to avoid repeated checks of each delta part for existence or emptiness, and wherein the simultaneous traversal further comprises:
   identifying a current value in the identified set of values corresponding to each delta part;
   identifying, a critical value among the identified current values, wherein the critical value is identified based on results of a value comparison performed between each two of the identified current values and determination results of a determination of whether each of the identified current values is the smallest value among the identified current values, and wherein at least one critical value is deduced based on the results and the determination results to minimize the use of computation resources to perform unnecessary value comparisons;
   setting the critical value as a value of a coordinating delta iterator; and
   identifying a next value in one or more of the identified set of values corresponding to each delta part, wherein the delta iterator assigned to a particular delta part is iterated to point to the next value of the identified set of values corresponding to each delta part based on a variable value based on the results of the value comparisons performed when identifying the critical value.

2. The method of claim 1, further comprising, for each of the plurality of delta parts of the database:
   obtaining an ordered sequence of the set of values of the attribute stored in the delta part of the database; and
   wherein identifying a current value in the set of values comprises identifying a current value in the ordered sequence of the set of values.

3. The method of claim 2, wherein the ordered sequence of the set of values of the attribute comprises the set of values in an ascending order according to a data type of the attribute.

4. The method of claim 1, wherein the critical value is a minimum value among the identified current values.

5. The method of claim 1, wherein identifying a next critical value among the next value in the set of values and the identified current values except the critical value comprises identifying the next critical value among the next value in the set of values and the identified current values except the critical value based on the results of the value comparison between each two of the identified current values.

6. The method of claim 1, further comprising recording, for each delta part, whether a current value of the delta part is the critical value among the identified current values of the plurality of delta parts.

7. A non-transitory, computer-readable medium storing computer-readable instructions executable by a computer and configured to:
   for each of a plurality of delta parts of a database that store values of an attribute of a database table, coordinating simultaneous traversal through an identified set of values within each delta part of the plurality of delta parts, wherein the traversal of each value of the set of values within each delta part is performed once using a delta iterator assigned to, and configured to only interact with, a particular delta part, wherein subclasses of a delta iterator data object class implementing the delta iterator are configured to be aware of non-empty delta parts of the plurality of delta parts to avoid repeated checks of each delta part for existence or emptiness, and wherein the simultaneous traversal further comprises:
   identify a current value in the identified set of values corresponding to each delta part;
   identify, a critical value among the identified current values, wherein the critical value is identified based on results of a value comparison performed between each two of the identified current values and determination results of a determination of whether each of the identified current values is the smallest value among the identified current values, and wherein at least one critical value is deduced based on the results and the determination results to minimize the use of computation resources to perform unnecessary value comparisons;
   setting the critical value as a value of a coordinating delta iterator; and
   identify a next value in one or more of the identified set of values corresponding to each delta part, wherein the delta iterator assigned to a particular delta part is iterated to point to the next value of the identified set of values corresponding to each delta part based on a variable value based on the results of the value comparisons performed when identifying the critical value.

8. The medium of claim 7, further comprising instructions operable to, for each of the plurality of delta parts of the database:
   obtain an ordered sequence of the set of values of the attribute stored in the delta part of the database; and
   wherein identifying a current value in the set of values comprises identifying a current value in the ordered sequence of the set of values.

9. The medium of claim 8, wherein the ordered sequence of the set of values of the attribute comprises the set of values in an ascending order according to a data type of the attribute.

10. The medium of claim 7, wherein the critical value is a minimum value among the identified current values.

11. The medium of claim 7, wherein identifying a next critical value among the next value in the set of values and the identified current values except the critical value comprises identifying the next critical value among the next value in the set of values and the identified current values except the critical value based on the results of the value comparison between each two of the identified current values.

12. The medium of claim 7, further comprising instructions operable to record, for each delta part, whether a current value of the delta part is the critical value among the identified current values of the plurality of delta parts.

13. A system, comprising:
a memory;
at least one hardware processor interoperably coupled with the memory and configured to:
for each of a plurality of delta parts of a database that store values of an attribute of a database table, coordinating simultaneous traversal through an identified set of values within each delta part of the plurality of delta parts, wherein the traversal of each value of the set of values within each delta part is performed once using a delta iterator assigned to, and configured to only interact with, a particular delta part, wherein subclasses of a delta iterator data object class implementing the delta iterator are configured to be aware of non-empty delta parts of the plurality of delta parts to avoid repeated checks of each delta part for existence or emptiness, and wherein the simultaneous traversal further comprises:
identify a current value in the identified set of values corresponding to each delta part;
identify, a critical value among the identified current values, wherein the critical value is identified based on results of a value comparison performed between each two of the identified current values and determination results of a determination of whether each of the identified current values is the smallest value among the identified current values, and wherein at least one critical value is deduced based on the results and the determination results to minimize the use of computation resources to perform unnecessary value comparisons;
setting the critical value as a value of a coordinating delta iterator; and
identify a next value in one or more of the identified set of values corresponding to each delta part, wherein the delta iterator assigned to a particular delta part is iterated to point to the next value of the identified set of values corresponding to each delta part based on a variable value based on the results of the value comparisons performed when identifying the critical value.

14. The system of claim 13, further configured to, for each of the plurality of delta parts of the database:
obtain an ordered sequence of the set of values of the attribute stored in the delta part of the database; and
wherein identifying a current value in the set of values comprises identifying a current value in the ordered sequence of the set of values.

15. The system of claim 14, wherein the ordered sequence of the set of values of the attribute comprises the set of values in an ascending order according to a data type of the attribute.

16. The system of claim 13, wherein the critical value is a minimum value among the identified current values.

17. The system of claim 13, wherein identifying a next critical value among the next value in the set of values and the identified current values except the critical value comprises identifying the next critical value among the next value in the set of values and the identified current values except the critical value based on the results of the value comparison between each two of the identified current values.

18. The system of claim 13, further configured to record, for each delta part, whether a current value of the delta part is the critical value among the identified current values of the plurality of delta parts.

* * * * *